United States Patent
Gokhale et al.

(10) Patent No.: US 11,815,044 B1
(45) Date of Patent: Nov. 14, 2023

(54) SYSTEMS AND METHODS FOR SELECTIVE CATALYTIC REDUCTION (SCR) MULTIPOINT DIAGNOSIS

(71) Applicant: Cummins Inc., Columbus, IN (US)

(72) Inventors: Rutika Kaustubh Gokhale, Columbus, IN (US); Adrian Adolfo Jarrin, Columbus, IN (US); Arun Shori Sundaravel Damotharan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/836,715

(22) Filed: Jun. 9, 2022

(51) Int. Cl.
*F02D 41/22* (2006.01)
*F02D 41/14* (2006.01)
*F01N 11/00* (2006.01)

(52) U.S. Cl.
CPC ........... *F02D 41/222* (2013.01); *F01N 11/00* (2013.01); *F02D 41/1463* (2013.01); *F01N 2550/05* (2013.01); *F01N 2560/026* (2013.01); *F01N 2900/1821* (2013.01); *F02D 2200/08* (2013.01)

(58) Field of Classification Search
CPC ............... F02D 41/222; F02D 41/1463; F02D 2200/08; F01N 11/00; F01N 2550/05; F01N 2560/026; F01N 2900/1821
See application file for complete search history.

(56) References Cited

U.S. PATENT DOCUMENTS

| | | | |
|---|---|---|---|
| 8,201,444 B2 | 6/2012 | Wang et al. | |
| 8,215,098 B2 | 7/2012 | Wang et al. | |
| 8,245,567 B2 | 8/2012 | Wang et al. | |
| 8,973,431 B2 | 3/2015 | Nagaoka et al. | |
| 9,422,847 B2 | 8/2016 | Osburn et al. | |
| 9,850,796 B2 | 12/2017 | Osburn et al. | |
| 9,879,580 B2 * | 1/2018 | Gupta | F01N 11/00 |
| 2010/0212417 A1 * | 8/2010 | Crawford | F01N 11/00 73/114.76 |
| 2017/0356322 A1 * | 12/2017 | Farid | F01N 11/007 |
| 2019/0227043 A1 * | 7/2019 | Jackson | F01N 9/00 |

* cited by examiner

*Primary Examiner* — Brandon D Lee
(74) *Attorney, Agent, or Firm* — Foley & Lardner LLP (57) ABSTRACT

Systems and methods for diagnosing an exhaust aftertreatment system are provided. A controller determines, for each sensor of a plurality of sensors, one or more performance parameters based on measurement data obtained from the sensor that is indicative of a performance of the sensor or a component of the exhaust aftertreatment system. The controller determines, for each performance parameter, a corresponding degradation level indicator indicative of a performance degradation of the corresponding sensor or the corresponding component of the exhaust aftertreatment system. The controller can determine, for each degradation level indicator, a corresponding diagnosis threshold value for detecting an operational state of the corresponding sensor or the corresponding component of the exhaust aftertreatment system. The controller can determine a multipoint diagnosis threshold value based on the diagnosis threshold values, and determine an operational state of the aftertreatment system using the multipoint diagnosis threshold value.

20 Claims, 5 Drawing Sheets

SYSTEMS AND METHODS FOR SELECTIVE CATALYTIC REDUCTION (SCR) MULTIPOINT DIAGNOSIS

TECHNICAL FIELD

The present disclosure relates to diagnosing exhaust aftertreatment systems. More particularly, the present disclosure relates to systems and methods for multipoint diagnosis of selective catalytic reduction (SCR) systems.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) or California Air Resources Board (CARB) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants.

SUMMARY

One embodiment relates to a method for diagnosing an exhaust aftertreatment system. The method includes determining, by a controller, for each sensor of a plurality of sensors, one or more performance parameters of the sensor based on measurement data obtained from the sensor; determining, by the controller, for each sensor of a plurality of sensors, one or more degradation level indicators indicative of sensor performance degradation, each degradation level indicator determined using a corresponding performance parameter of the sensor; determining, by the controller, for each sensor of the plurality of sensors, one or more diagnosis threshold values, each diagnosis threshold value of the one or more diagnosis threshold values determined using a corresponding degradation level indicator and is for detecting an operational state of a component or a subsystem of the exhaust aftertreatment system; determining, by the controller, a multipoint diagnosis threshold value using diagnosis threshold values associated with the plurality of sensors; and determining, by the controller, an operational state of the aftertreatment system by comparing a conversion inefficiency of the aftertreatment system to the multipoint diagnosis threshold value.

In one embodiment, the diagnosis may be of a SCR and, hence, a SCR diagnosis threshold may be used. In some embodiments, instead of or in addition to the sensor, an input component may be used such as an actuator whereby performance parameters regarding the component are determined and utilized.

Another embodiment relates to a system for diagnosing an exhaust aftertreatment system. The system includes a controller comprising a processor coupled to a memory storing executable instructions, the executable instructions when executed by the processor cause the processor to: determine, for each sensor of a plurality of sensors, one or more performance parameters of the sensor based on measurement data obtained from the sensor; determine, for each sensor of a plurality of sensors, one or more degradation level indicators indicative of sensor performance degradation, each degradation level indicator determined using a corresponding performance parameter of the sensor; determine, for each sensor of the plurality of sensors, one or more diagnosis threshold values, each diagnosis threshold value of the one or more diagnosis threshold values determined using a corresponding degradation level indicator and is for detecting an operational state of a component or a subsystem of the exhaust aftertreatment system; determine, a multipoint diagnosis threshold value using diagnosis threshold values associated with the plurality of sensors; and determine, an operational state of the exhaust aftertreatment system by comparing a conversion inefficiency of the exhaust aftertreatment system to the multipoint diagnosis threshold value.

Still another embodiment relates to a non-transitory computer-readable medium comprising executable instructions that, when executed by a processor, cause the processor to: determine, for each sensor of a plurality of sensors, one or more performance parameters of the sensor based on measurement data obtained from the sensor; determine, for each sensor of a plurality of sensors, one or more degradation level indicators indicative of sensor performance degradation, each degradation level indicator determined using a corresponding performance parameter of the sensor; determine, for each sensor of the plurality of sensors, one or more diagnosis threshold values, each diagnosis threshold value of the one or more diagnosis threshold values determined using a corresponding degradation level indicator and is for detecting an operational state of a component or a subsystem of the exhaust aftertreatment system; determine, a multipoint diagnosis threshold value using diagnosis threshold values associated with the plurality of sensors; and determine, an operational state of the exhaust aftertreatment system by comparing a conversion inefficiency of the exhaust aftertreatment system to the multipoint diagnosis threshold value.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, methods, apparatuses, and systems for multipoint diagnosis of an exhaust aftertreatment system, and particularly, multipoint diagnosis of a selective catalytic reduction (SCR) system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As environmental regulations become more stringent, consistent aftertreatment system performance is important to keep vehicle emissions within compliance. Consistent aftertreatment system performance is dependent on components of the aftertreatment system functioning correctly, so detecting when aftertreatment system components are malfunctioning (or functioning outside of acceptable bounds) may be an important function. One such aftertreatment system component is the Selective Catalytic Reduction (SCR) system, which converts nitrous oxides (NOx) in the exhaust stream into less harmful nitrogen and water. SCR health can be determined based on a conversion efficiency, which refers to how efficiently the SCR is converting NOx into less harmful elements, or conversion inefficiency. Determining the health state of the SCR or other components of the exhaust aftertreatment system can depend on measurements from various sensors. The performance of the sensors can degrade over time. If such degradation(s) is/are not taken into account, the detection of failing components may not be accurate leading to false alarms and/or missed failure events. Also, multiple components of the exhaust aftertreatment system may fail together leading multiple failures.

Systems and methods described herein allow for multipoint (MPD) diagnosis of the exhaust aftertreatment system and, particularly, of the SCR subsystem that may include a reductant doser, at least one NOx sensor, and a SCR catalyst (among potentially other components/subsystems). Diagnosis thresholds that depend on degradation levels of sensors are determined and a MPD diagnosis threshold is computed/determined based on the diagnosis thresholds. The MPD diagnosis threshold is used to detect failures in the exhaust aftertreatment system.

Figure 1:
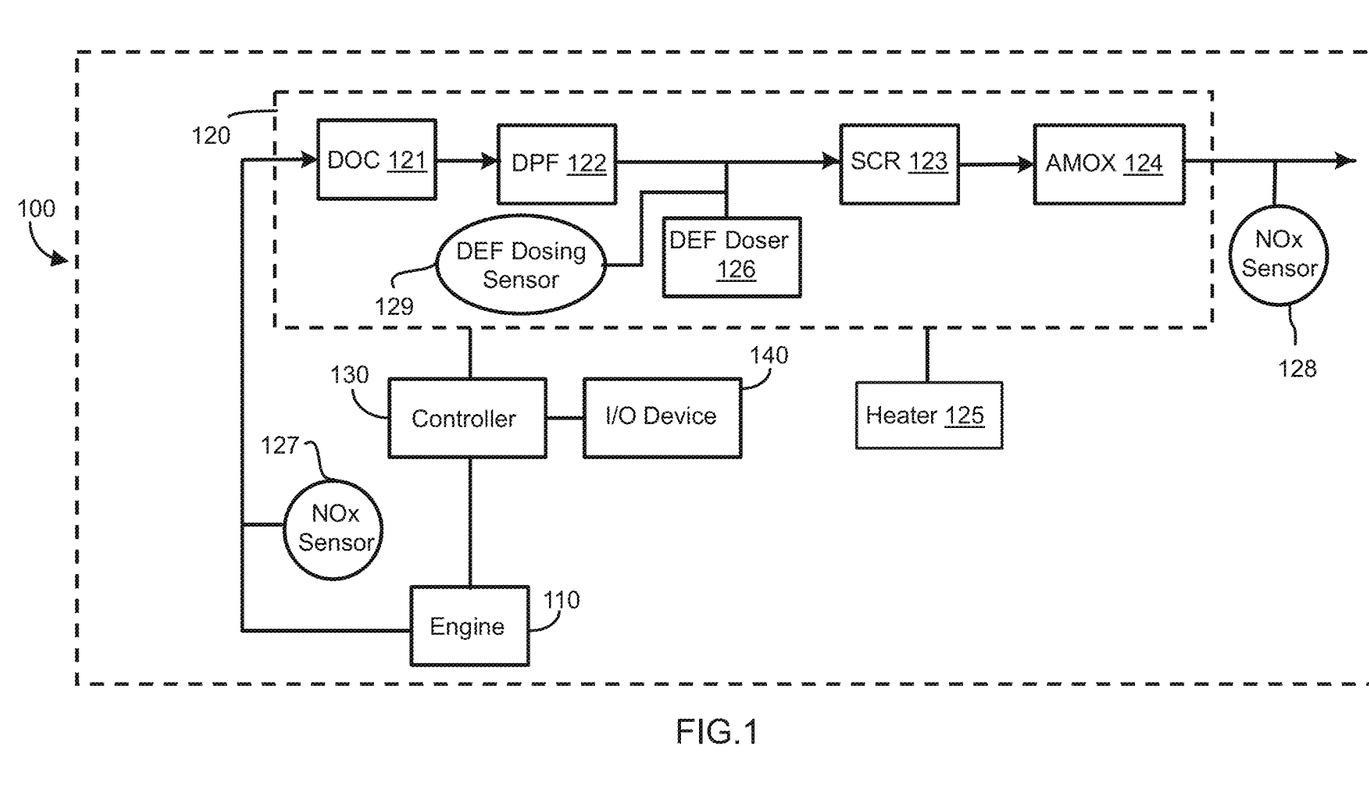
FIG. 1 is a schematic diagram of a vehicle, according to an exemplary embodiment.

Referring now to FIG. 1, a schematic diagram of a vehicle 100 is shown, according to an example embodiment. In brief overview, the vehicle 100 can include an engine 110, an aftertreatment system 120, a controller 130 an operator input/output (I/O) device 140. The aftertreatment system 120 can include a diesel oxidation catalyst (DOC) 121, a diesel particulate filter (DPF) 122, a selective catalytic reduction (SCR) subsystem 123, an ammonia oxidation catalyst (AMOX) 124, a heater 125 and a diesel exhaust fluid (DEF) doser (or DEF pump) 126. The vehicle 100 can one or more sensors, such as an engine-out nitrogen oxide (NOx) sensor 127, a system-out NOx sensor 128 and a DEF dosing sensor 126, to monitor operational parameters or states of one or more systems or components of the vehicle 100. The vehicle 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, locomotives, marine vehicles, aviation vehicles, and other types of vehicles. In another embodiment, the vehicle 100 can be a stationary piece of equipment, such as a power generator or genset. In general, embodiments disclosed in the present disclosure can be applicable to vehicles and/or pieces of equipment that include internal-combustion engines.

The engine 110 may be any type of internal combustion engine that generates exhaust gas (e.g., compression ignition or a spark ignition engine that may utilize various fuels, such as natural gas, gasoline, diesel fuel, jet fuel, etc.). In some embodiments, the vehicle 100 can be an at least partially hybrid vehicle where power from the internal combustion engine may be replaced by and/or supplemented with an electric motor. In either configuration, the engine 110 includes one or more cylinders and associated pistons. In this regard, air from the atmosphere is combined with fuel, and combusted, to power the engine 110. Combustion of the fuel and air in combustion chambers of the engine 110 produces exhaust gas that is operatively vented to an exhaust pipe and to the aftertreatment system 120. In the example shown in FIG. 1, the engine 110 is structured as an internal combustion engine and particularly, a compression-ignition engine powered by diesel fuel.

The aftertreatment system 120 is structured to receive exhaust-gas from the engine 110. Specifically, the DOC 121 is structured to receive the exhaust gas from the engine 110 and to oxidize hydrocarbons and carbon monoxide in the exhaust gas, such as NO oxidation to NO2, to promote passive DPF regeneration and fast SCR reaction. The DPF 122 is arranged or positioned downstream of the DOC 121 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some implementations, the DPF 122 may be omitted.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The DEF doser 126 can inject the reductant upstream of the SCR subsystem 123, such that the SCR subsystem 123 receives a mixture of the reductant and exhaust gas. The reductant droplets then undergo the processes of evaporation, thermolysis, and hydrolysis to form gaseous ammonia within the decomposition chamber, e.g., the SCR subsystem 123 and/or the exhaust gas conduit system. The gaseous ammonia leaves the aftertreatment system 120. The aftertreatment system 120 may further include an oxidation catalyst (e.g. the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, the operating temperature can be approximately between 200-500° C. In some implementations, the operating temperature can be the temperature at which the hydrocarbon conversion efficiency of the DOC 121 exceeds a predefined threshold. The hydrocarbon conversion efficiency refers to the efficiency of the conversion of hydrocarbon to less harmful compounds.

The SCR subsystem 123 is configured to reduce or at least assist in the reduction of NOx emissions by accelerating a NOx reduction process between the DEF from the DEF doser 126 and the NOx of the exhaust gas into diatomic nitrogen, water, and/or carbon dioxide. If the SCR subsystem 123 is not at or above a certain temperature, the acceleration of the NOx reduction process is limited and the SCR subsystem 123 may not be operating at a necessary level of efficiency to meet regulations. In some implementations, the temperature can be approximately 250-300° C. The SCR subsystem 123 may be made from a combination of an inactive material and an active catalyst, such that the inactive material (e.g. ceramic metal) directs the exhaust gas towards the active catalyst. The active catalyst can be any sort of material suitable for catalytic reduction (e.g. base metals oxides like vanadium, molybdenum, tungsten, etc. or noble metals like platinum). In some implementations, the AMOX 124 is included with the aftertreatment system 120 and is structured to address ammonia slip by removing excess ammonia from the treated exhaust gas before the treated exhaust is released into the atmosphere.

Because the aftertreatment system 120 treats the exhaust gas before the exhaust gas is released into the atmosphere, some of the particulate matter or chemicals that are treated or removed from the exhaust gas may build up in the aftertreatment system 120 over time. For example, the soot filtered out from the exhaust gas by the DPF 122 may build up on the DPF 122 over time. Similarly, sulfur particles present in fuel may accumulate in the SCR subsystem 123 and deteriorate the effectiveness of the SCR subsystem 123. Further, DEF that undergoes incomplete thermolysis upstream of the catalyst may build up and form deposits on downstream components of the aftertreatment system 120. However, these build-ups on (and subsequent deterioration of effectiveness of) these components of the aftertreatment system 120 may be reversible. In other words, the soot, sulfur, and DEF deposits may be substantially removed from the DPF 122 and the SCR subsystem 123 by increasing a temperature of the exhaust gas running through the aftertreatment system 120 to recover performance (e.g. for the SCR subsystem 123, conversion efficiency of NOx to $N_2$ and other compounds). These removal processes are referred to as regeneration events and may be performed for the DPF 122, SCR subsystem 123, or another component in the aftertreatment system 120 on which deposits develop. However, exposure to high temperatures during active regenerations degrades the DOC, DPF, and SCR catalysts. An active regeneration event is specifically commanded, such as a flow rate measurement through a DPF 122 being below a predefined threshold indicating a partially blocked DPF which, in turn, causes the controller 130 to command a regeneration event where exhaust gas temperatures are elevated in order to raise the temperature of the DPF 122 and burn off the accumulated particulate matter (PM) and other components (e.g., raise engine power output, post-injection, and other means to increase exhaust gas temperatures to cause a regeneration event). In contrast, a passive regeneration event occurs naturally during operation of the vehicle (e.g., a high load condition that may be experienced while traversing a hill causes an increase in exhaust gas temperatures and regeneration event occurs naturally—not specifically commanded).

In some embodiments, the heater 125 can be located in the exhaust flow path before the aftertreatment system 120, and can be structured to controllably heat the exhaust gas upstream of the aftertreatment system 120. In some embodiments, the heater 125 can located directly before the DOC 121, directly before the SCR subsystem 123 or directly before the AMOX 124. The heater 125 may be any sort of external heat source that can be structured to increase the temperature of passing exhaust gas, which, in turn, increases the temperature of components in the aftertreatment system 120, such as the DOC 121 or the SCR subsystem 123. The heater 125 may be an electric heater, a grid heater, a heater within the SCR subsystem 123, an induction heater, a microwave, or a fuel-burning (e.g., hydrocarbon fuel) heater. The heater 125 may be controlled by the controller 130 during an active regeneration event in order to heat the exhaust gas (e.g., by convection). In some implementations, the heater 125 may be positioned proximate a desired component to heat the component (e.g., DPF 122) by conduction and possibly convection. Multiple heaters may be used with the exhaust aftertreatment system 120. The multiple heaters may be structured the same or differently (e.g., conduction, convection, etc.).

The vehicle 100 can include one or more sensors, such as the engine-out NOx sensor 127, the system-out NOx sensor 128 and the DEF dosing sensor 129, for measuring parameters indicative of how various components of the exhaust aftertreatment system 120 are operating or performing. For instance, the engine-out NOx sensor 127 measures the amount or rate of NOx release by the engine 110, while the system-out NOx sensor 128 measures the amount or rate of NOx release by the aftertreatment system 120 or by the SCR subsystem 123. The engine-out NOx sensor 127 is positioned in the exhaust flow immediately downstream of the engine 100, and acquires data indicative of the NOx amount/rate at or approximately at its disposed location. The system-out NOx sensor 128 is positioned in the exhaust flow immediately downstream of the aftertreatment system 120, and acquires data indicative of the NOx amount/rate at or approximately at its disposed location. The DEF dosing sensor 129 measures the pumping speed of the DEF doser 126 and/or the DEF flow rate from the DEF doser 126. In some implementations, the vehicle 100 can include multiple DEF dosing sensors 129. For example, the vehicle 100 can include a first DEF dosing sensor for measuring the pumping speed of the DEF doser 126 and a second DEF dosing sensor for measuring the DEF flow rate from the DEF doser 126. The DEF dosing sensor(s) 129 can positioned within or immediately downstream of the DEF doser 126. It should be understood that the depicted locations, numbers, and type of sensors is illustrative only. In other embodiments, different/additional sensors may also be included within the vehicle 100 (e.g., a pressure sensor, a flow rate sensor, a temperature sensor, etc.). Those of ordinary skill in the art will appreciate and recognize the high configurability of the sensors in the vehicle 100.

The controller 130 can be communicatively coupled to the sensors and various components or systems of the vehicle 100. The controller 130 can receive measurements from the sensors, and use the sensor measurements to diagnose components and/or systems of the vehicle 100. For instance, the controller 130 can use measurements of the NOx sensors 127 and 128 and/or the DEF dosing sensor 129 to diagnose the aftertreatment system 120 or component thereof. In general, the controller 130 is communicatively coupled to systems and components of the vehicle 100, and is structured to acquire operation data and/or on-board diagnostics (OBD) capability data regarding one or more of the components or systems shown in FIG. 1. For example, the operation data may include data regarding operating conditions of the engine 110 and/or the aftertreatment system 120 acquired by one or more sensors, such as the engine-out NOx sensor 127, the system-out NOx sensor 128 and/or the DEF dosing sensor 129. A more detailed description of the controller 130 is provided below in relation with FIG. 2.

Components or systems of the vehicle 100 may communicate with each other or remote components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and/or wireless connections. In some implementations, the controller 130 communicates with other components of the vehicle 100 via the CAN bus.

The operator I/O device 140 may be communicatively coupled to the controller 130, such that information may be exchanged between the controller 130 and the I/O device 140. The exchanged information may relate to one or more components of FIG. 1 or determinations (described below) of the controller 130. The operator I/O device 140 enables an operator of the vehicle 100 to communicate with the controller 130 and one or more components of the vehicle 100 of FIG. 1. For example, the operator I/O device 140 may include, but is not limited to, an interactive display, a touchscreen device, one or more buttons and switches, voice command receivers, etc.

Figure 2:
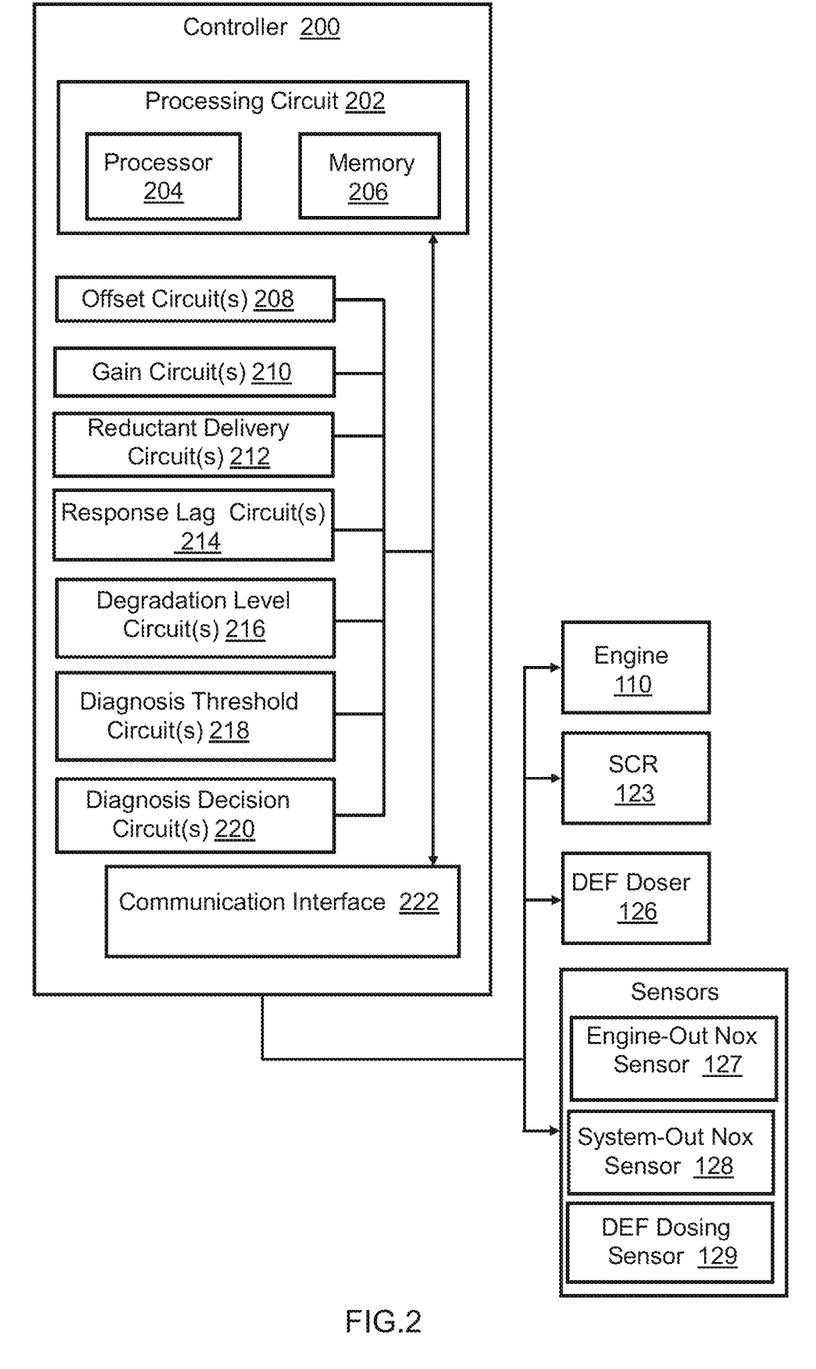
FIG. 2 is a schematic diagram of a controller of the vehicle of FIG. 1, according to an exemplary embodiment.

Referring now to FIG. 2, a schematic diagram of a controller 200 of the vehicle 100 of FIG. 1 is shown, according to example embodiments. The controller 200 is the same as, and represents a more detailed implementation of, the controller 130 shown in FIG. 1. The controller 200 includes a processing circuit 202 having a processor 204 and a memory 206. The controller 200 includes one or more offset circuits 208, one or more gain circuits 210, one or reductant delivery circuits 212, one or more response lag circuits 214, one or more degradation level circuits 216, one or more diagnosis threshold circuits 218, one or more diagnosis decision circuits 220 and a communications interface 222. The offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 can be part of the processing circuit 202 or separate components within the controller 130. The controller 130 may be structured as one or more electronic control units (ECU).

The controller 130 is structured to receive data or information from an input component, such as a sensor or an actuator. In particular, the controller 130 is structured to receive sensor data from the sensors, e.g., the NOx sensors 127 and 128 and/or the DEF dosing sensor 129, in the vehicle 100, and determine, for each sensor, one or more performance parameters based on measurement data obtained from the sensor. Each performance parameter indicates a performance of the sensor or a component of the exhaust aftertreatment system associated with the sensor. The controller 130 determines, for each performance parameter, a corresponding degradation level indicator indicative of a performance degradation of the corresponding sensor or the corresponding component of the exhaust aftertreatment system. The controller 130 determines, for each degradation level indicator, a corresponding diagnosis threshold value for detecting an operational state of a component or a subsystem of the exhaust aftertreatment system. The diagnosis threshold can be a SCR diagnosis threshold. For example, the controller 130 is structured to determine a SCR diagnosis threshold value for detecting an operational state of the SCR subsystem 123 of the aftertreatment system 120 or a component thereof. The diagnosis threshold value can be an updated diagnosis threshold for diagnosing faulty or degraded components or subsystems of the exhaust aftertreatment system 120, such as the SCR subsystem 123 or components thereof. The controller 130 can determine a multipoint diagnosis threshold value based on the diagnosis threshold values, and determine an operational state of the exhaust aftertreatment system 120 using the multipoint diagnosis threshold value.

The processing circuit 202 or the processor 204 may be structured or configured to execute or implement the instructions, commands, and/or control processes described herein with respect to the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220. The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The processor 204 may be a microprocessor. The processor 204 also may be implemented as a combination of computing devices, such as a combination of a DSP and a microprocessor, a plurality of microprocessors, one or more microprocessors in conjunction with a DSP core, or any other such configuration. In some implementations, the controller 130 may include one or more processors 204, which may be shared by multiple circuits (e.g., the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may comprise or otherwise share the same processor which, in some example embodiments, may execute instructions stored, or otherwise accessed, via different areas of memory). In some implementations, the one or more processors may be structured to perform or otherwise execute certain operations independent of one or more co-processors. Two or more processors may be coupled via a bus to enable independent, parallel, pipelined, or multi-threaded instruction execution. All such variations are intended to fall within the scope of the present disclosure.

The memory 206 (e.g., memory unit and/or storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

In some implementations, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s)

220 are embodied or implemented as machine-executable instructions that are stored in the memory 206 (or other memory or storage device) and executed by the processor 204. The offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 can be embodied or implemented as machine or computer-readable media storing instructions that are executable by the processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In some implementations, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 are embodied as hardware units, such as electronic control units. As such, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may be embodied as one or more circuitry components including, but not limited to, processing circuitry, network interfaces and/or other circuitry components. In some implementations, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may also include programmable hardware devices such as field programmable gate arrays, programmable array logic, programmable logic devices or the like. The offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may include one or more memory devices for storing instructions that are executable by one or more processor(s) of these circuits. The one or more memory devices and processor(s) may have the same definition as provided above with respect to the memory 206 and processor 204. In some hardware unit configurations, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may be geographically dispersed throughout separate locations in the vehicle 100. In some implementations, the offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may be embodied in or within a single unit/housing, which is shown as the controller 200 in FIG. 2.

The communications interface 222 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 222 may include an Ethernet card and port for sending and receiving data via an Ethernet-based communications network and/or a Wi-Fi transceiver for communicating via a wireless communications network. The communications interface 222 may be structured to communicate via local area networks or wide area networks (e.g., the Internet) and may use a variety of communications protocols (e.g., IP, LON, Bluetooth, ZigBee, radio, cellular, near field communication). The controller 130 can communicate with the engine 110, the SCR subsystem 123, the DEF doser 126, the engine-out NOx sensor 127, the system-out NOx sensor 128, the DEF dosing sensor 129, other components of the exhaust aftertreatment system 120 and/or other component of the vehicle 100 via the communications interface 222.

The offset circuit 208 is structured or configured to receive measurement data from the engine-out NOx sensor 127 and/or the system-out NOx sensor 128, and determine whether a sensor (e.g., any of these sensors) exhibits a reading or measurement offset. Over time, NOx sensors, such as the engine-out NOx sensor 127 and/or the system-out NOx sensor 128, can degrade and exhibit reading errors in the form of an output offset. Such errors can result in false diagnosis of the exhaust aftertreatment system 120 or the corresponding components. For instance, the sensor offset can lead to false alarm detections (e.g., falsely detecting a component to be degraded or failing when it is not) and/or missed target detections (e.g., falsely detecting a component to be normal when it is degraded or failing). The offset circuit 208 is structured or configured to detect and/or determine the value(s) of any offset(s) of the engine-out NOx sensor 127 and/or the system-out NOx sensor 128. The offset values of the NOx sensors 127 and 128 may be either high or low. A high offset value indicates that the sensed NOx value is above the actual NOx value. That is the offset value is a positive value (i.e., >0). A low offset value indicates that the sensed NOx value is below the actual NOx value. That is, the offset value is a negative value (i.e., <0).

During motoring events, engine out NOx values, e.g., in parts per million (ppm), are expected to be low or zero. The offset circuit 208 is structured to determine if there is a high or a low offset of the engine-out NOx sensor 127 during motoring events. The offset circuit 208 can determine an average reading (or average output) of the engine-out NOx sensor 127 during motoring events, and compare the average reading to high and/or low NOx thresholds. The offset circuit 208 computes or determines an offset value of the engine-out NOx sensor 127 as a difference between the average reading engine-out NOx sensor 127 and the low/high NOx threshold.

During high SCR conversion efficiency regions, engine idle, engine off and motoring events, NOx values (in ppm) measured by the system-out NOx sensor 128 at the tailpipe are expected to be low or zero. The offset circuit 208 can be structured to determine when there are NOx offsets during the above expected low NOx events. The offset circuit 208 can determine an average reading (or average output) of the system-out NOx sensor 128 during high SCR conversion efficiency regions, engine idle, engine off and motoring events, and compare the average reading to high and/or low NOx thresholds. The offset circuit 208 can compute or determine an offset value of the system-out NOx sensor 128 as a difference between the average reading of the system-out NOx sensor 128 and the low/high NOx threshold.

In some implementations, the offset circuit 208 can employ one or more virtual NOx sensors to detect and/or compute values of offsets of the engine-out NOx sensor 127 and/or the system-out NOx sensor 128. For instance, the offset circuit 208 can compare NOx measurements from the engine-out NOx sensor 127 and/or the system-out NOx sensor 128 with NOx values provided by a virtual NOx sensor. In some implementations, the controller 130 can include multiple offset circuits 208 such as a first offset circuit for detecting and/or determining offsets of the engine-out NOx sensor 127 and a second offset circuit for detecting and/or determining offsets of the system-out NOx sensor 128. The offset circuit 208 can determine or isolate which NOx sensor has a high or a low offset.

The gain circuit 210 is structured or configured to receive measurement data from the engine-out NOx sensor 127 and/or the system-out NOx sensor 128, and determine whether a sensor (e.g., any of these sensors) exhibit a reading or measurement gain. NOx sensors, such as the engine-out NOx sensor 127 and/or the system-out NOx sensor 128, can degrade by exhibit reading errors in the form of an output gain. Similar to the NOx reading offsets, such errors can result in false diagnosis of the exhaust aftertreatment system 120 or the corresponding components. The gain circuit 210 is structured or configured to detect and/or determine the value(s) of output gain(s) of the engine-out NOx sensor 127 and/or the system-out NOx sensor 128.

During stable engine operating conditions, certain values such as $O_2$ measurement by the engine-out NOx sensor 127, $O_2$ measurement by the system-out NOx sensor 128 and $O_2$ value provided by a virtual engine-out sensor are expected to be the same or substantially the same. If the engine-out NOx sensor 127 and/or the system-out NOx sensor 128 exhibit an output gain, e.g., due to $O_2$-NOx correlation, such gain may be reflected in the $O_2$ signal(s) from the respective sensor. The gain circuit 210 is structured to compare the $O_2$ measurement values from the engine-out NOx sensor 127 and the system-out NOx sensor 128 to the $O_2$ value obtained from the virtual sensor to determine which NOx sensor is exhibiting a gain. The gain circuit 210 can divide the $O_2$ measurement values from the engine-out NOx sensor 127 and the system-out NOx sensor 128 by the $O_2$ value obtained from the virtual sensor to determine the gain value associated with each of the engine-out NOx sensor 127 and the system-out NOx sensor 128. The gain circuit 210 can determine or isolate which NOx sensor has a high or a low gain. In some implementations, the controller 130 can include multiple gain circuits 210, with each gain circuit 210 associated with one of the NOx sensors 127 and 128. The gain circuit 210 can compare the gains of the engine-out NOx sensor 127 and the system-out NOx sensor 128 to corresponding thresholds. A gain value of the NOX sensor 127 or 128 can be a high gain value (e.g., >1) or a low gain value (e.g., <1).

The reductant delivery circuit 212, also referred to herein as DEF dosing circuit 212, can be structured or configured to detect DEF overdosing and/or DEF under-dosing. During dosing commands, the DEF dosing sensor(s) 129 can measure DEF pump speed and/or DEF flow from the DEF doser 126, and provide measured/estimated values to the reductant delivery circuit 212. The controller 130 can act as the dosing controller or the dosing controller can be a separate controller, such that the controller 130 can control reductant dosing. The reductant delivery circuit 212 compares the measured or estimated values received from the DEF dosing sensor(s) 129 against one or more thresholds to detect DEF overdosing or under-dosing. The reductant delivery circuit 212 can determine or compute an overdosing parameter or an under-dosing parameter as the difference between the measured values from the DEF dosing sensor(s) 129 the threshold(s). In some implementations, the dosing controller may override dosing commands to achieve favorable dosing condition for diagnosis. The reductant delivery circuit 212 can compare the overdosing parameter or the under-dosing parameter to a corresponding threshold.

The response lag circuit 214 is structured or configured to detect a response, such as a slow response, of the engine-out NOx sensor 127. During stable engine operating conditions, a sufficient change in virtual NOx may correlate with a change in the reading or measurement of the engine-out NOx sensor 127. If the engine-out NOx sensor 127 suffers from slow response, or a lag in sensor response, changes in the NOx readings/measurements from the engine-out NOx sensor 127 lag changes in the virtual NOx values. The response lag circuit 214 can measure or determine a time lag between the virtual NOx sensor and the engine-out NOx sensor 127, and compare the time lag to a corresponding threshold.

The offset circuit(s) 208, the gain circuit(s) 210, the reductant delivery circuit 212 and the response lag circuit 214 are configured as performance parameter circuits as they are structured to determine performance parameters of various sensors. It should be understood that similar circuits may also be employed for other components of the system, such as actuators, to determine performance of these components. Such performance parameters indicate performances or health states of the sensors. For instance, the offset, gain and/or response time lag are indicative of performance degradations of the NOx sensors 127 and 128. The overdosing and under-dosing parameters are indicative of performance degradations of the DEF dosing sensor 129.

In some implementations, the offset circuit(s) 208, the gain circuit(s) 210, the reductant delivery circuit(s) 212 and/or the response lag circuit(s) 214 employ or utilize a moving average, a weighted moving average or an exponentially weighted moving average in computing corresponding performance parameters. For example, the offset circuit 208 can compute the offset of a NOx sensor a moving average, a weighted moving average or an exponentially weighted moving average of a plurality of offset values computed using recent sensor measurement values. The same can be true for the gain circuit 210 when determining the NOx sensors' gains, the reductant delivery circuit 212 when determining the under-dosing or the overdosing parameter, and the response lag circuit 214 when determining the time lag in the sensor's response.

The degradation level circuit 216 is structured or configured to determine for each input component (e.g., an actuator, each sensor of the plurality of sensors that are being utilized for a diagnosis such as a SCR diagnosis, etc.) one or more degradation level indicators. The degradation level circuit 216 can compute or determine, for each performance parameter (also referred to herein as diagnosis decision) of the sensors 127, 128 and 129 (e.g., computed by the circuits 208, 210, 212 and 214), a corresponding degradation level indicator indicative of a degradation of the corresponding sensor. For instance, the degradation level circuit 216 can determine a degradation indicator (of the engine-out NOx sensor 127) based on the offset of the engine-out NOx sensor 127, a degradation indicator (of the engine-out NOx sensor 127) based on the gain of the engine-out NOx sensor 127, a degradation indicator (of the engine-out NOx sensor 127) based on the response lag (or slow response) of the engine-out NOx sensor 127, a degradation indicator (of the system-out NOx sensor 128) based on the offset of the system-out NOx sensor 128, a degradation indicator (of the system-out NOx sensor 128) based on the gain of the system-out NOx sensor 128 and a degradation indicator (of the DEF dosing sensor 129) based on the reductant delivery performance (or under-dosing or overdosing parameter) of the DEF dosing sensor 129. In some implementations, the controller 130 can include a plurality of degradation level circuits 116, with each degradation level circuit 116 structured to determine a degradation level indicator associated a respective performance parameter among the plurality of performance parameters associated with the sensors 127, 128 and 129.

In some implementations, the degradation level circuit 216 can determine or compute each degradation level indicator (DLI) as:

$$DLI = \left(1 - \left(\frac{\text{calibrated component diagnosis threshold} - \text{component diagnosis decision}}{\text{calibrated component diagnosis threshold} - \text{calibrated nominal value}}\right)\right) \times 100.$$

The diagnosis decision, or component diagnosis decision, represents the value of the corresponding performance parameter (e.g., engine-out NOx sensor offset, engine-out NOx sensor gain, system-out NOx sensor offset, system-out NOx sensor gain, engine-out NOx sensor lag or overdosing/under-dosing parameter). The above formula is saturated at 0 and 255%. The calibrated component (e.g., sensor) diagnosis threshold is the component threshold which is used to determine the degradation level indicator. More particularly, the calibrated diagnostic threshold may be the trigger or threshold at which the sensor/component will trigger an indicator and, particularly, a malfunction indicator lamp (MIL) (e.g. +25 ppm for a NOx sensor offset diagnostic triggers a MIL and a fault code). As a specific example, this DLI is used to calculate or determine a SCR MPD's diagnostic threshold which is described herein below. In operation, the calibrated diagnostic decision from a sensor/component is converted to a failure level where a first value (e.g., 100) or a second opposite value (e.g., −100) indicates a failure on the high side or low side and 0 indicates a perfectly nominal system. The calibrated nominal value is the reference point to indicate that the sensor/component is healthy or nominal. For a NOx sensor offset diagnostic, this calibrated nominal value may be calibrated to approximately −5 ppm to indicate healthy nominal behavior. Therefore, when a diagnosis decision of 10 ppm offset is made, DLI=(1−(25−10)/(25−(−5)))*100=50%. In this regard, the sensor is 50% degraded towards a complete failure.

In some implementations, one or more look-up tables can be used instead of the above formulation to determine one or more degradation level indicators. Especially where the diagnostic decision does not vary linearly, a look up table may be used. Table 1 below illustrates an example lookup table for determining the degradation level indicator corresponding to the system-out NOx sensor offset.

TABLE 1

| System-out NOx Sensor Offset | Degradation Level Indicator |
| --- | --- |
| 8 | 10 |
| 25 | 70 |
| 40 | 80 |
| 60 | 125 |
| 85 | 140 |

The diagnosis threshold circuit 218 is structured to determine, for each sensor of the plurality of sensors, one or more diagnosis threshold values (e.g., SCR diagnosis threshold values). The diagnosis threshold circuit 218 determines each diagnosis threshold using a corresponding degradation level indicator. For example, the diagnosis threshold circuit 218 determines a diagnosis threshold corresponding to the degradation level indicator determined based on the engine-out NOx sensor offset, a diagnosis threshold corresponding to the degradation level indicator determined based on the system-out NOx sensor offset, a diagnosis threshold corresponding to the degradation level indicator determined based on the engine-out NOx sensor gain, a diagnosis threshold corresponding to the degradation level indicator determined based on the system-out NOx sensor gain, a diagnosis threshold corresponding to the degradation level indicator determined based on the engine-out NOx sensor response lag, and a diagnosis threshold corresponding to the degradation level indicator determined based on the DEF overdosing/under-dosing parameter. In some implementations, the controller 130 (particularly, the diagnosis threshold circuit 218) is structured or configured to determine diagnosis thresholds (or SCR diagnosis thresholds) associated with corresponding performance parameters or corresponding degradation level indicators.

Each diagnosis threshold is for detecting an operational state of a component or subsystem of the exhaust aftertreatment system 120, such as the SCR subsystem 123 or components thereof. More particularly, the diagnosis threshold corresponds to a degradation level indicator that is used to determine a defective component, such as a SCR. In this regard, the diagnosis threshold takes into account the degradation level of the component (e.g., SCR) and its effect on the conversion efficiency while coming up with the diagnosis threshold (e.g., for SCR MPD). The degradation level indicator indicates the defective aftertreatment system component. For example, the diagnosis threshold corresponding to the degradation level indicator that is determined based on the DEF overdosing/under-dosing parameter is used for calculating the final SCR MPD diagnosis threshold to determine the state of the SCR subsystem. The diagnosis threshold corresponding to the degradation level indicator determined based on the system-out NOx offset is used for detecting whether the SCR subsystem 123 is defective of failing.

The diagnosis threshold circuit 218 can determine each diagnosis threshold using a corresponding look-up table. Each degradation level indicator can have a separate lookup table to calculate the corresponding diagnosis threshold. For instance, the degradation level parameter associated with the engine-out NOx sensor offset can have a separate lookup table, the degradation level parameter associated with the engine-out NOx sensor gain can have a separate lookup table, the degradation level parameter associated with the system-out NOx sensor offset can have a separate lookup table, and so on. Table 2 below depicts an example lookup table for determining diagnosis thresholds, and particularly SCR MPD diagnosis thresholds (%), associated with a given performance parameter.

TABLE 2

| Degradation Level Indicator (%) | Diagnosis Threshold (%) |
| --- | --- |
| 0 | 15 |
| 25 | 15 |
| 50 | 12 |
| 75 | 10 |
| 100 | 8 |
| 200 | 6 |
| 255 | 5 |

The diagnosis threshold circuit 218 is structured to determine a multipoint diagnosis (MPD) threshold based on the thresholds associated with the various performance parameters (or associated with the various degradation level indicators). The diagnosis threshold circuit 218 can determine the MPD threshold to be equal to the minimum of various candidate diagnosis thresholds associated with various sensor performance parameters (e.g., engine-out NOx sensor offset, system-out NOx sensor offset, engine-out NOx sensor gain, system-out NOx sensor gain, engine-out NOx sensor response lag and under-dosing/overdosing parameter). "Candidate" indicates each sensor/component that is used as a potential candidate threshold of which the minimum is chosen to be the final threshold. The use of the minimum value is due to the fact that SCR conversion inefficiency is used to diagnose the operational state of the exhaust aftertreatment system 120. Using the minimum diagnosis threshold as the MPD threshold allows for detecting a failure whenever the SCR conversion inefficiency exceeds any of the diagnosis thresholds.

The diagnosis decision circuit 220 is structured or configured to detect failure of the exhaust aftertreatment system 120 or components thereof. The diagnosis decision circuit 220 compares the SCR inefficiency to the MPD threshold. The SCR inefficiency may be determined using this formula: (1−(EONOx−SONOx)/EONOx)*100. This formula may be simplified to SONOx/EONOx*100, which provides the SCR conversion inefficiency as a percentage value. In this formula, "EONOx" refers to a engine-out NOx (which may be determined by a NOx sensor positioned in an exhaust manifold) while "SONOx" refers to system-out NOx (which may be determined by a NOx sensor positioned in a tailpipe at or near where exhaust emissions are emitted to the environment). The formula indicates the conversion inefficiency and, as such, may be referred to as the SCR conversion inefficiency. If the SCR conversion inefficiency is less than the MPD threshold, the diagnosis decision circuit 220 determines that there is no MPD failure, and stores the decision in a memory, e.g., memory 206. Otherwise, the diagnosis decision circuit 220 determines the existence of a MPD failure. When a MPD failure is detected, the diagnosis decision circuit 220 stores an indication which component failure/degradation caused SCR MPD failure/fault. For instance, the diagnosis decision circuit 220 stores an indication of the component associated with the minimum diagnosis threshold. Storing the component associated with a minimum diagnosis threshold will result in easy or relatively easy replacement of that sensor/component along with the catalyst. This will ensure or attempt to ensure a speedy service and reduced customer down time. SCR system diagnostic robustness also significantly increases due to the replacement of degraded sensor/component. The SCR conversion inefficiency is compared, in one embodiment, to only the final SCR MPD threshold, which is the minimum of all the thresholds.

Figure 3:
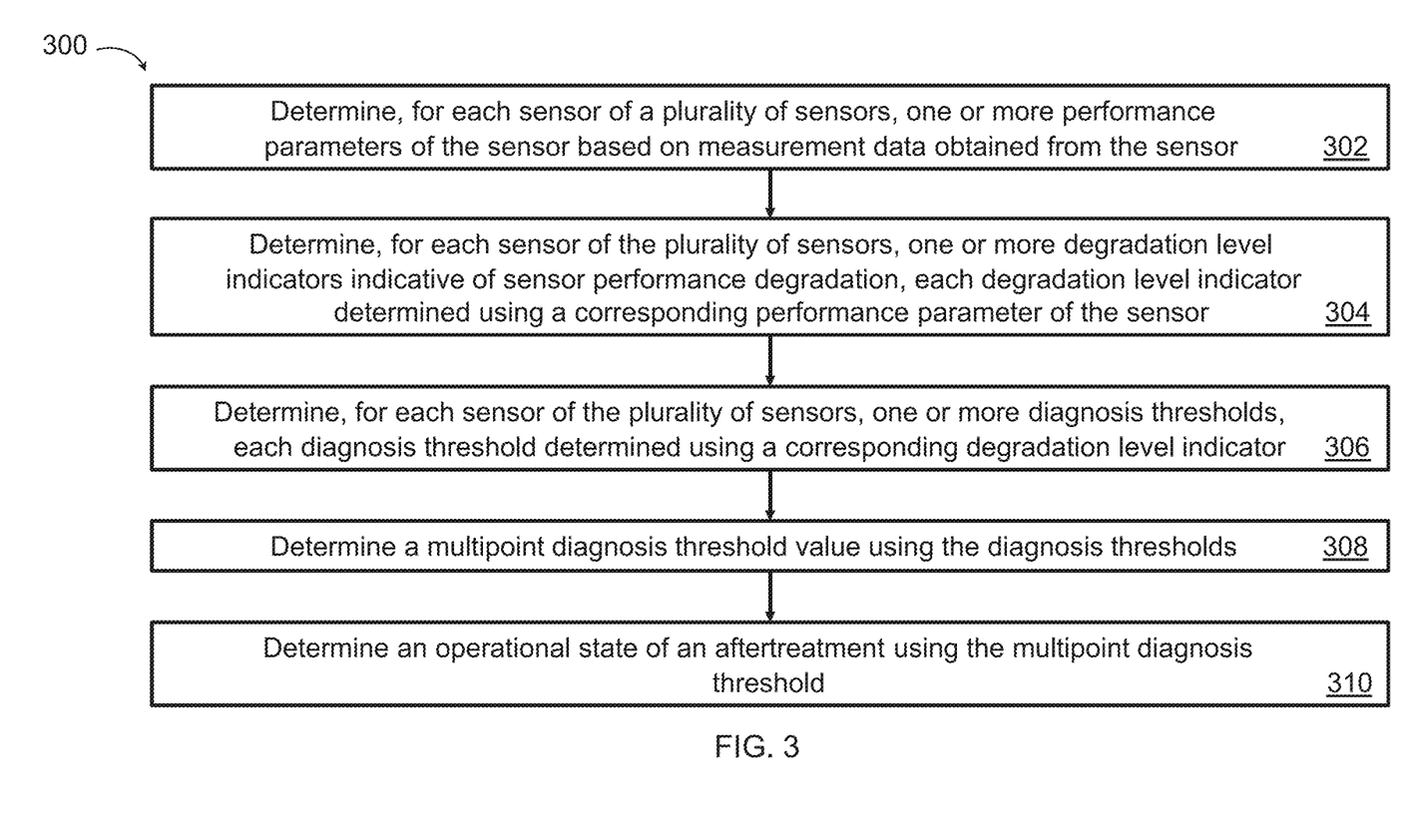
FIG. 3 is a flow chart of a method for multipoint diagnosis of an after treatment system, according to an exemplary embodiment.

Referring now to FIG. 3, a flowchart of a method 300 for diagnosing an exhaust aftertreatment system is shown, according to example embodiments. The method 300 can include the controller 200 determining, for each component (e.g., each sensor of a plurality of sensors, each actuator, etc.) one or more performance parameters of the component (e.g., sensor) based on measurement data obtained from the component (e.g., sensor) (STEP 302). The performance parameters of the sensors can include the engine-out NOx sensor offset, the engine-out NOx sensor gain, the engine-out NOx sensor response lag, the system-out NOx sensor offset, the system-out NOx sensor gain and the DEF under-dosing/overdosing parameter, and can be determined as discussed above in relation with the circuits 208, 210, 212 and 214.

The method 300 can include the controller 200 determining, for each component (e.g., sensor), one or more degradation level indicators indicative of component (sensor) performance degradation, where each degradation level indicator is determined using a corresponding component (sensor) performance parameter (STEP 304). The controller 300 or the degradation level circuit(s) 316 can determine the degradation level indicators as discussed above in relation with FIG. 2.

The method 300 can include the controller 200 determining, for each component (sensor), one or more diagnosis thresholds (STEP 306), and determine a multipoint diagnosis (MPD) threshold based on the determined diagnosis thresholds (STEP 308). The controller 200 or the diagnosis threshold circuit(s) 318 can determine each diagnosis threshold using a separate degradation level indicator, as discussed above in relation with the diagnosis threshold circuit(s) 318. The controller 200 or the diagnosis threshold circuit(s) 318 can determine the MPD threshold as the minimum of the diagnosis thresholds.

The method 300 can include the controller 200 determining an operational state (e.g., level of degradation) of the exhaust aftertreatment system 120 using the MPD threshold (STEP 310). The controller 200 or the diagnosis decision circuit 220 can compare a SCR conversion inefficiency value to the MPD threshold to determine whether there is an MPD failure. In the case of an MPD failure, the controller 200 or the diagnosis decision circuit 220 can store an indication of failing components. If no MPD failure, the controller 200 or the diagnosis decision circuit 220 can store an indication of a no MPD failure decision.

Figure 4:
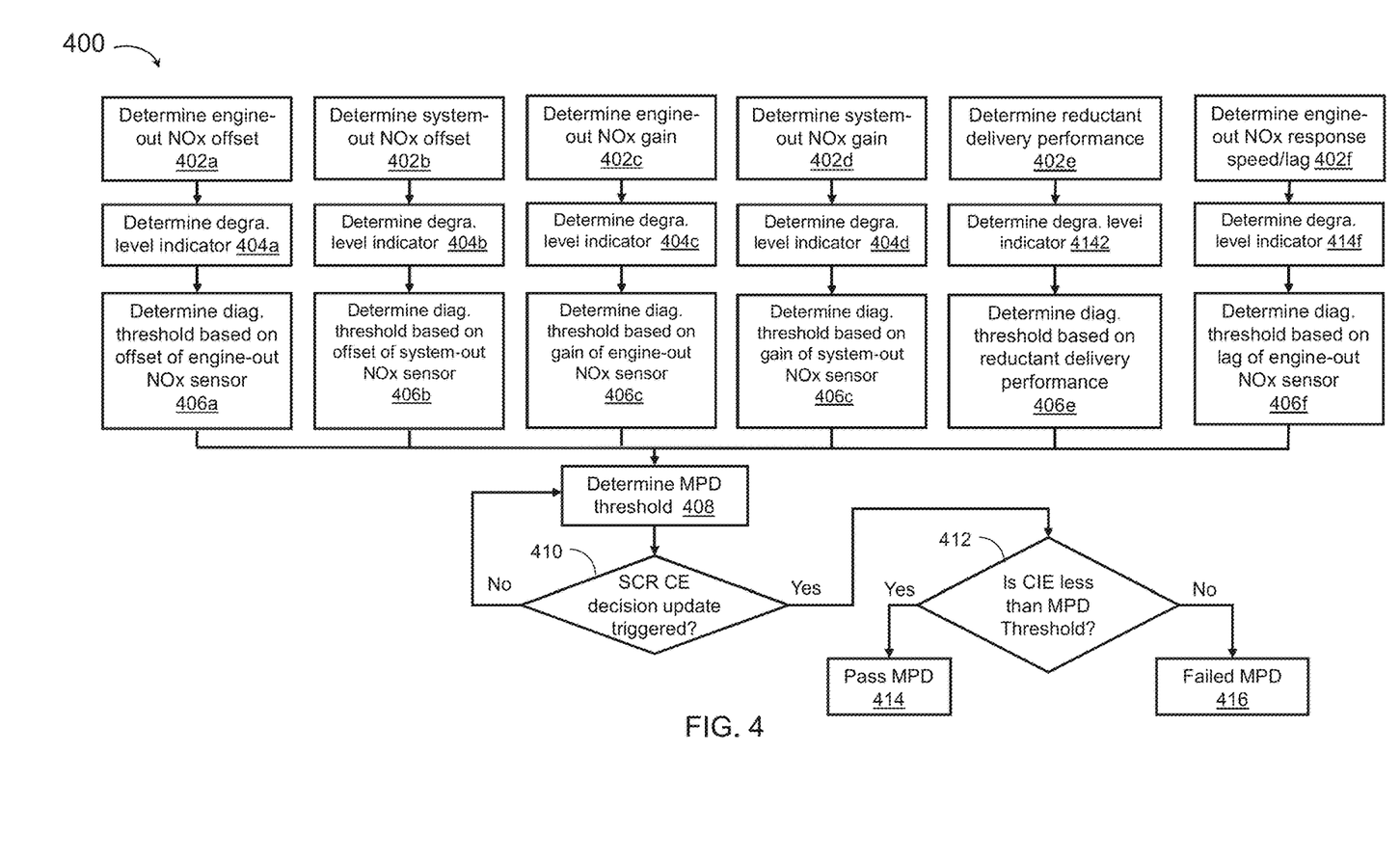
FIG. 4 is a flow chart of an example implementation of the multipoint diagnosis method of FIG. 3, according to an exemplary embodiment.

Referring now to FIG. 4, a flowchart of another method 400 of diagnosing the exhaust aftertreatment system 120 is shown, according to example embodiments. The method 400 can be viewed as a detailed implementation of method 300. At steps 402a-402b, the offset circuit 208 determines the engine-out NOx sensor offset and the system-out NOx sensor offset, respectively. At steps 402c-402d, the gain circuit 210 determines the engine-out NOx sensor gain and the system-out NOx sensor gain, respectively. At step 402*e*, the reductant delivery circuit 212 determines the DEF underdosing/overdosing parameter. At step 402*f*, the response lag circuit 214 determines the response lag of the engine-out NOx sensor 127.

At steps 404*a*-404*f*, the degradation level circuit 216 determines a separate degradation level indicator for each of the performance parameters determined at steps 402*a*-420*f*. At the steps 406*a*-406*f*, the diagnosis threshold circuit 218 determines a separate diagnosis threshold for each degradation level indicator determined at steps 404*a*-404*f*. At step 408, the diagnosis threshold circuit 218 determines an MPD diagnosis threshold as the minimum diagnosis threshold. At 410, a SCR conversion efficiency decision update is triggered. The SCR conversion efficiency diagnostic collects samples of NOx sensor data when enable conditions for the SCR CE diagnostic are true. When sufficient samples are collected, the SCR CE diagnostic determines that an update to the diagnostic decision can be made.

Based on the results of the SCR MPD, the controller 130 is structured to perform one or more actions. For example, the controller 130 may trigger, generate, or otherwise light a lamp to indicate a need for a service event (e.g., dashboard indicator light). As another example and in a service environment, the results may drive out of mission test procedures to identify correct replacement parts. As still another example, other customers/users may use the information (e.g., through an OBD scan tool or smart dashboard) on degradation level of SCR input component systems and identify which component(s) are degraded along with failed SCR during multiple component degradation scenarios. This information can be used to identify correct replacement parts.

When the controller 130 executes and sets the MIL for SCR MPD diagnostic during driving situations, based on the sensor/component that had the maximum DLI (degradation level indicator), the controller 130 may perform a variety of actions on the engine and/or aftertreatment system. For example, the controller 130 may disable/reduce DEF dosing (when the SCR fails the MPD), may disable closed loop control on DEF and engine out NOx control systems, may modify DEF and engine out NOx control systems to use modeled sensor signals when input sensor signals cannot be trusted, may de-rate engine power output (when the SCR fails the MPD), may stop vehicle operation after meeting certain conditions, and/or may trigger high temperature regeneration events to clean the aftertreatment system.

Figure 5:
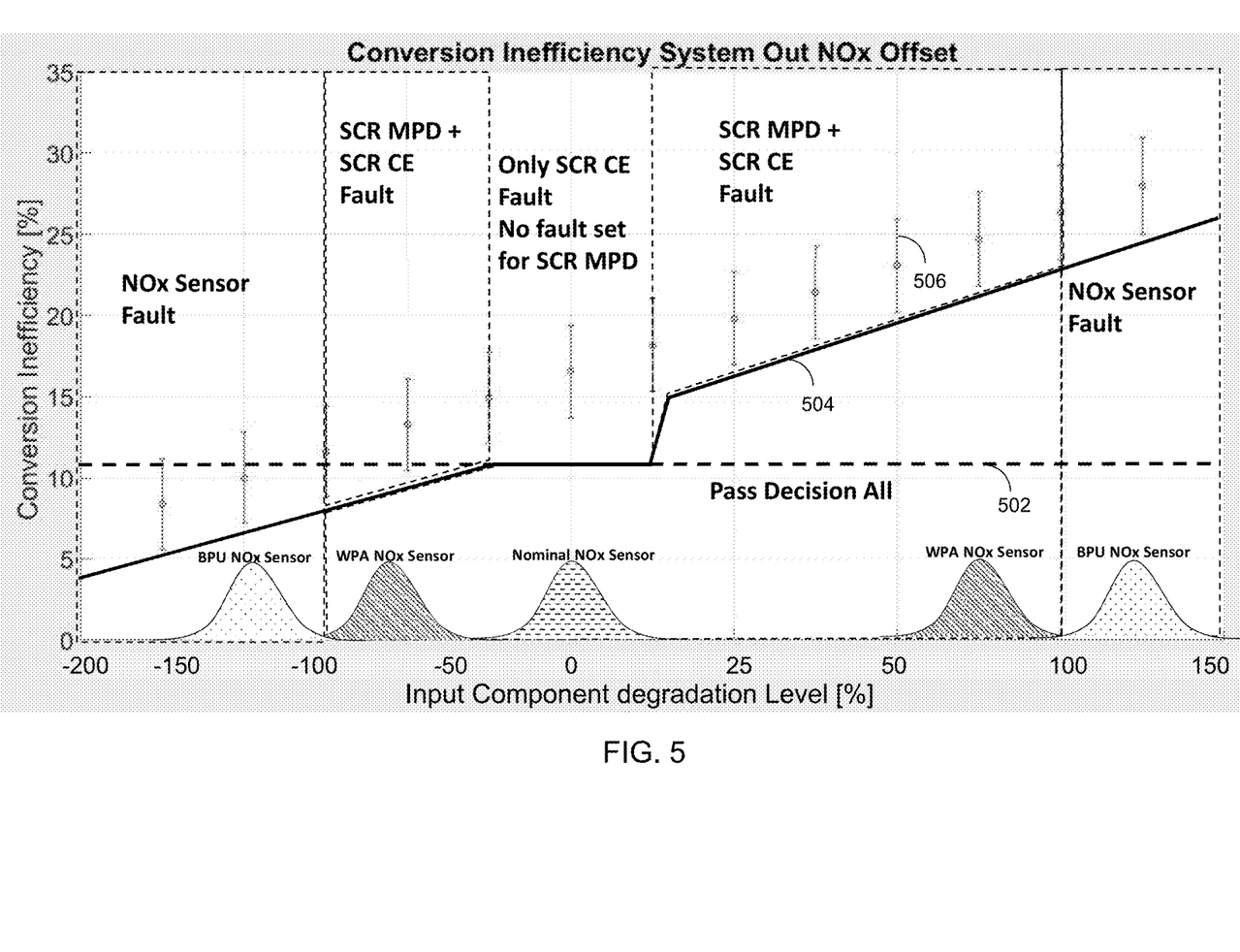
FIG. 5 is a plot of diagnosis threshold values as a function of component degradation level, according to an exemplary embodiment.

Referring now to FIG. 5, a plot of diagnosis threshold values as a function of a degradation level associated with system-out NOx sensor offset is shown, according to an example embodiments. The horizontal dashed line 502 represents a constant diagnosis threshold, which does not take into account any offset of the system-out NOx sensor 128. The line or plot 504 represents a diagnosis threshold that is a function of the degradation level. The diagnosis threshold depicted by the line or plot 504 varies as the system-out NOx sensor offset varies. The region below the plot 504 represents the region where the diagnosis decision indicates no failure. The left and right regions (indicated as "NOx sensor Fault") represent regions where the system-out NOX sensor 128 (or more generally the input component) is failing. The region above the plot 504 represents a region where the diagnosis decision indicates a failure or fault. The bars 506 represent simulated distributions of SCR conversion inefficiency at different degradation levels of the input component (e.g., system-out NOx sensor 128).

The triangular region between the horizontal dashed line 502 and the plot 504 within the degradation level range −100 to about −30 represents a region of missed SCR failures when using a constant diagnosis threshold (e.g., corresponding to the horizontal dashed line 502). The region between the horizontal dashed line 502 and the plot 504 on the right (e.g., degradation level greater than 12) represents a false alarm region (e.g., falsely detecting a SCR failure) when using a constant diagnosis threshold (e.g., corresponding to the horizontal dashed line 502). The use of MPD diagnosis threshold improves the diagnosis decision by avoiding false alarms and missed failures. As depicted in FIG. 5, the plot 504 representing the diagnosis threshold tracks the simulated distributions 506 of SCR conversion inefficiency better than the dashed line 502 representing a constant diagnosis threshold.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of offset circuit(s) 208, gain circuit(s) 210, reductant delivery circuit(s) 212, response lag circuit(s) 214, degradation level circuit(s) 216, diagnosis threshold circuit(s) 218 and/or diagnosis decision circuit(s) 220 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method for diagnosing an exhaust aftertreatment system, the method comprising:
   determining, by a controller, for each sensor of a plurality of sensors, one or more performance parameters of each sensor based on measurement data obtained from each sensor;
   determining, by the controller, for each sensor of the plurality of sensors, one or more degradation level indicators indicative of one or more failure levels of each sensor, each of the one or more degradation level indicators determined using a corresponding performance parameter;
   determining, by the controller, for each sensor of the plurality of sensors, one or more diagnosis threshold values, each diagnosis threshold value of the one or more diagnosis threshold values determined using a corresponding degradation level indicator and used for detecting an operational state of a component or a subsystem of the exhaust aftertreatment system;
   determining, by the controller, a multipoint diagnosis threshold value using the diagnosis threshold values associated with the plurality of sensors;
   determining, by the controller, an operational state of the aftertreatment system by comparing a conversion inefficiency of the aftertreatment system to the multipoint diagnosis threshold value; and
   causing, based on the operational state of the aftertreatment system, an indication of a failure in the aftertreatment system to be displayed on a display device.

2. The method of claim 1, wherein the plurality of sensors includes an engine-out nitrogen oxide (NOx) sensor.

3. The method of claim 2, wherein the one or more performance parameters of the engine-out NOx sensor include at least one of:
   an offset of the engine-out NOx sensor;
   a gain of the engine-out NOx sensor; or
   a response lag parameter of the engine-out NOx sensor, the response lag parameter indicative of a time lag associated with measurements of the engine-out NOx sensor compared to a virtual sensor.

4. The method of claim 2, further comprising:
   determining, by the controller, that the engine-out NOx sensor is faulty based on at least one of (i) a comparison of the offset of the engine-out NOx sensor to a first predefined value or (ii) a comparison of the gain of the engine-out NOx sensor to a second predefined value.

5. The method of claim 1, wherein the plurality of sensors includes a system-out nitrogen oxide (NOx) sensor located downstream of a selective catalytic reduction (SCR) subsystem in the aftertreatment system.

6. The method of claim 5 wherein the one or more performance parameters of the system-out NOx sensor include at least one of an offset or a gain of the system-out NOx sensor.

7. The method of claim 5, further comprising:
   determining, by the controller, that the system-out NOx sensor is faulty based on at least one of (i) a comparison of the offset of the system-out NOx sensor to a first predefined value or (ii) a comparison of the gain of the system-out NOx sensor to a second predefined value.

8. The method of claim 1, wherein the plurality of sensors includes one or more diesel exhaust fluid (DEF) dosing sensor structured to measure at least one of a pumping speed of a DEF pump or DEF flow.

9. The method of claim 8 wherein the one or more performance parameters of the DEF dosing sensor include a DEF dosing parameter indicative of DEF overdosing or DEF under-dosing.

10. The method of claim 1, wherein the multipoint diagnosis threshold is determined as a minimum of the diagnosis threshold values associated with the plurality of sensors.

11. A system for diagnosing an exhaust aftertreatment system, the system comprising:
a controller comprising a processor coupled to a memory storing executable instructions, the executable instructions when executed by the processor cause the processor to:
determine, for each sensor of a plurality of sensors, one or more performance parameters of each sensor based on measurement data obtained from each sensor;
determine, for each sensor of the plurality of sensors, one or more degradation level indicators indicative of one or more failure levels of each sensor, each of the one or more degradation level indicators determined using a corresponding performance parameter;
determine, for each sensor of the plurality of sensors, one or more diagnosis threshold values, each diagnosis threshold value of the one or more diagnosis threshold values determined using a corresponding degradation level indicator and used for detecting an operational state of a component or a subsystem of the exhaust aftertreatment system;
determine a multipoint diagnosis threshold value using the diagnosis threshold values associated with the plurality of sensors;
determine, an operational state of the exhaust aftertreatment system by comparing a conversion inefficiency of the exhaust aftertreatment system to the multipoint diagnosis threshold value; and
cause, based on the operational state of the aftertreatment system, an indication of a failure in the aftertreatment system to be displayed on a display device.

12. The system of claim 11, wherein the plurality of sensors includes an engine-out nitrogen oxide (NOx) sensor.

13. The system of claim 12, wherein the one or more performance parameters of the engine-out NOx sensor include at least one of:
an offset of the engine-out NOx sensor;
a gain of the engine-out NOx sensor; or
a response lag parameter of the engine-out NOx sensor, the response lag parameter indicative of a time lag associated with measurements of the engine-out NOx sensor compared to a virtual sensor.

14. The system of claim 12, wherein the processor is further configured to:
determine that the engine-out NOx sensor is faulty based on at least one of (i) a comparison of the offset of the engine-out NOx sensor to a first predefined value or (ii) a comparison of the gain of the engine-out NOx sensor to a second predefined value.

15. The system of claim 11, wherein the plurality of sensors includes a system-out nitrogen oxide (NOx) sensor located downstream of a selective catalytic reduction (SCR) subsystem in the aftertreatment system.

16. The system of claim 15 wherein the one or more performance parameters of the system-out NOx sensor include at least one of an offset or a gain of the system-out NOx sensor.

17. The system of claim 15, wherein the processor is further configured to:
determine that the system-out NOx sensor is faulty based on at least one of (i) a comparison of the offset of the system-out NOx sensor to a first predefined value or (ii) a comparison of the gain of the system-out NOx sensor to a second predefined value.

18. The system of claim 11, wherein the plurality of sensors includes one or more diesel exhaust fluid (DEF) dosing sensor structured to measure at least one of a pumping speed of a DEF pump or DEF flow.

19. The system of claim 18 wherein the one or more performance parameters of the DEF dosing sensor include a DEF dosing parameter indicative of DEF overdosing or DEF under-dosing.

20. A non-transitory computer-readable medium comprising executable instructions that, when executed by a processor, cause the processor to:
determine, for each sensor of a plurality of sensors, one or more performance parameters of each sensor based on measurement data obtained from each sensor;
determine, for each sensor of the plurality of sensors, one or more degradation level indicators indicative of one or more failure levels of the sensor, each of the one or more degradation level indicators determined using a corresponding performance parameter;
determine, for each sensor of the plurality of sensors, one or more diagnosis threshold values, each diagnosis threshold value of the one or more diagnosis threshold values determined using a corresponding degradation level indicator and used for detecting an operational state of a component or a subsystem of the exhaust aftertreatment system;
determine a multipoint diagnosis threshold value using the diagnosis threshold values associated with the plurality of sensors;
determine, an operational state of the exhaust aftertreatment system by comparing a conversion inefficiency of the exhaust aftertreatment system to the multipoint diagnosis threshold value; and
cause, based on the operational state of the aftertreatment system, an indication of a failure in the aftertreatment system to be displayed on a display device.

* * * * *